Jan. 18, 1949. W. H. CHURCHILL 2,459,307
CABLE AND THE LIKE SUPPORTING STRUCTURES
Filed April 29, 1944

Inventor
Wilmer H. Churchill
By Walter S. Jones
Attorney

Patented Jan. 18, 1949

2,459,307

UNITED STATES PATENT OFFICE 2,459,307

CABLE AND THE LIKE SUPPORTING STRUCTURES

Wilmer H. Churchill, Saugus, Mass., assignor to United-Carr Fastener Corporation, Cambridge, Mass., a corporation of Massachusetts Application April 29, 1944, Serial No. 533,418

6 Claims. (Cl. 248—74)

The present invention relates to cable harness clamps and the like and aims generally to improve existing clamps of this type.

It is frequently desirable to provide a plurality of electrical conductors in certain vehicles, such for example as large aircraft, ships, railway cars and the like, and to secure these conductors into grouped relation by means of clamps mounted upon a supporting structure of the vehicle, such for example as transversely disposed or longitudinally extending girders, beams and the like.

For convenience and economy of assembly it is frequently desirable that the clamps be mounted upon the supports by means of a fastener member. However, these fastener members tend to become loosened in use due to the vibration of the vehicle and the flexibility of the cable.

The present invention aims to overcome the above stated objections by the provision of a cable harness clamp adapted to be mounted upon a suitable support by a fastener and which will permit some freedom of movement of a group of cables relative to the support.

A further object of the invention is to provide an improved cable harness clamp having a mounting member swivelly attached thereto, which mounting member is preferably constructed and arranged to receive a tongue-type fastener member for detachably mounting the clamp to a support.

Other objects and advantages of the invention will be apparent from an inspection of the drawings and the annexed specification illustrating and describing two preferred forms of the invention.

Figure 1:
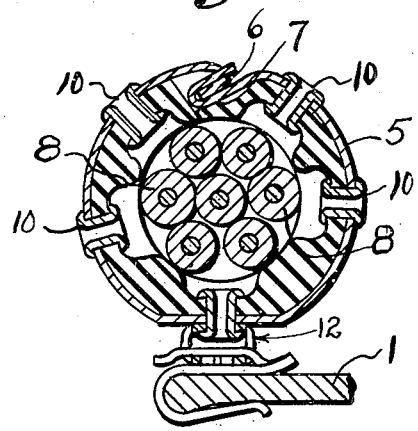
Fig. 1 is a transverse sectional view of one form of cable clamp embodying my invention, the same being illustrated as attached to a support by a suitable tongue-type fastener member.
Figure 2:
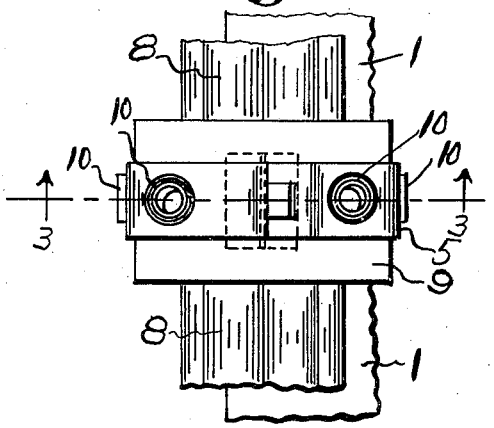
Fig. 2 is a detailed plan view thereof.
Figure 3:
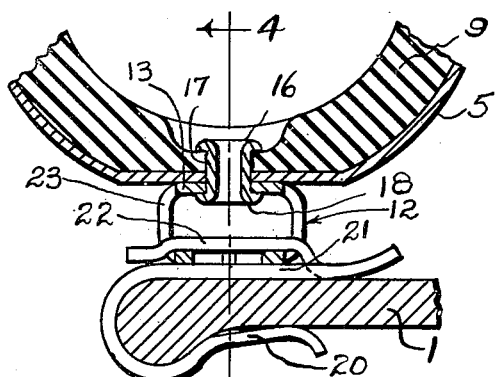
Fig. 3 is a fragmental sectional view taken on the line 3—3 of Fig. 2.
Figure 4:
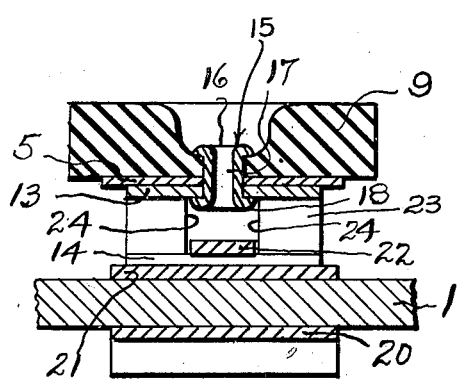
Fig. 4 is a fragmental sectional view taken on the line 4—4 of Fig. 3.

Referring to the drawings, a typical installation comprises a clamp for securing a group of electrical cables in assembled relationship and a mounting therefor swivelly connected thereto and adapted to receive a fastener member for attaching the mounting to a support. The support 1 may be any conventional part of the framework or supporting part of the vehicle and advantageously is a part of the framework having a free edge over which a fastener member may be attached.

The clamp advantageously comprises a band-like member 5 preferably formed of resilient metal having reversely disposed hooked ends 6 and 7 to be readily connected together to form a loop to receive and hold a plurality of conductors 8, as illustrated in Fig. 1. The band may have a lining 9 of highly flexible insulating material, for example, a strip of sponge rubber or the like secured in place by means of rivets 10.

The invention provides an improved and simplified mounting for the clamp and according to one form thereof this mounting may comprise a mounting member 12 having a supporting surface or bridge portion 13 adapted to be swivelly connected to a portion of the band 5 intermediate the ends thereof and a base portion 14 spaced from the bridge portion 13 and adapted to receive fastening means for attaching the mounting to the support 1. The bridge portion 13 is preferably swivelly connected to the band 5 intermediate the ends thereof by means of a rivet 15 which advantageously may have an enlarged head 16 bearing upon the inner face of the lining 9, a tubular shank 17 extending through the lining 9, band 5 and bridge portion 13 and an upset head 18 underlying the bridge portion 13. The mounting member may conveniently be formed of sheet metal of looped form having a relatively flat base portion 14 adapted to bear against a supporting surface, for example the supporting surface of the fastener member connecting the mounting to the support 1.

To provide for quick assembly of the installation, it is desirable to attach the clamp mounting to the support by means of a snap fastener member, for example a clip 20 which may be formed of a single piece of resilient metal bent to substantially U-shaped form to be slipped over the edge of the support 1 into gripping engagement with the opposite sides thereof. The fastener member 20 is preferably of the tongue-type having a supporting portion 21 and a resilient tongue 22 struck from an intermediate part thereof and normally disposed out of the plane of the supporting portion 21 so as to receive the clamp mounting.

According to one form of the invention, the clamp mounting 12 is formed as an open-ended loop and has its side portions 23 connecting the bridge 13 and base 14. The base 14 may be slotted as at 24 to receive the tongue 22 of the fastener clip. Preferably the slot is of a width slightly in excess of the width of the tongue 22 of the fastener clip so as to permit the mounting to be slipped over the tongue of the clip with the base portion 14 thereof in gripping relation between the tongue 22 and the supporting portion of the clip. Alternatively, the tongue 22 of the fastener clip may be inserted through an open end of the loop mounting 12 to engage and grip the base 14 thereof. The particular form of the clip per se forms no part of the present invention except that it should preferably be of a type having an article-receiving tongue.

The construction above described permits the mounting of the clamp 5 swivelly upon the support 1. The mounting and clamp may be readily affixed to the support by first slipping the fastener clip 20 over the edge of the support 1 and in clamping engagement therewith and then slipping the clamp mounting 12 upon the supporting surface 21 of the fastener clip 20 with the tongue 22 positioned within the slotted sides 23 of the mounting. This construction permits the base of the mounting to be securely clamped between the tongue and the supporting portion of the fastener clip. The improved clamp and mounting enables the clamp to be positioned angularly with respect to the support so as to permit slight angular movement of the band to accommodate changes of position of the clamped cables due to vibration of the vehicle without tendency to move the mounting or fastener clip from the support.

Figure 5:
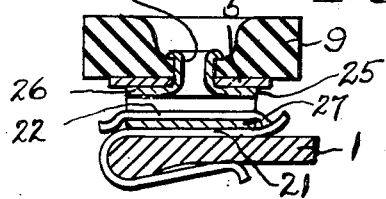
Fig. 5 is a fragmental sectional view of the base portion of a clamp and illustrating a modified form of swivel mounting therefor.
Figure 7:
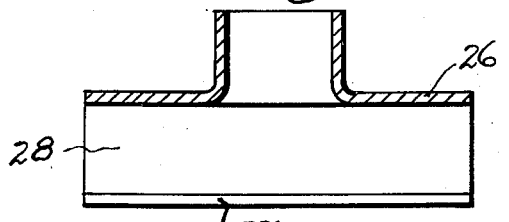
Fig. 7 is a detail sectional view thereof taken on the line 7—7 of Fig. 6.
Figure 6:
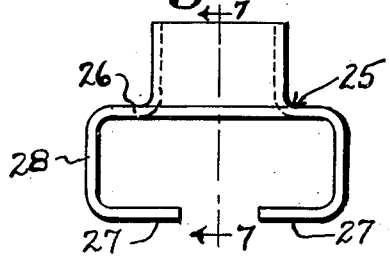
Fig. 6 is an end view of the mounting member illustrated in Fig. 5.

In Figs. 5, 6 and 7 I have illustrated an alternative form of swivel mounting for the clamp which may comprise an open-ended loop member 25 providing a bridge portion 26 and a spaced base portion 27 connected by sides 28. The bridge portion 26 may be formed with an outwardly extending tubular member 29 drawn from the material of the bridge portion and constituting a pivot extending through the base 5 and lining 9 of the clamp.

The mounting is advantageously secured to the fastener clip by inserting the tongue through an open end thereof so that the base portions 27 of the mounting are gripped between the tongue 22 and supporting portion 21 of the fastener clip.

Although I have illustrated and described two preferred forms of my invention, I do not wish to be limited thereby because the scope of my invention is best defined in the following claims.

I claim:

1. A cable harness clamp comprising a resilient band having an intermediate base portion and terminal ends adapted to be connected to form a closed loop for engaging an article therein, a mounting member having a bridge portion and a spaced base portion, a swivel connection between said bridge portion and band base, the base of said mounting member being slotted to receive part of a tongue-type fastener member for attaching the mounting to a support.

2. A cable harness clamp comprising a resilient band adapted to be bent and secured in substantially circular form to receive and hold an article thereon, a loop-shaped mounting member therefor having spaced bridge and base portions, means for swivelly connecting said band and bridge portions, and a side of said mounting member intermediate the bridge and base portions being apertured to receive a fastener element for removably attaching said mounting to a support.

3. A cable harness clamp comprising a resilient band adapted to be bent and secured in substantially circular form to receive and hold an article thereon, an open-ended loop-shaped mounting member therefor having spaced bridge and base portions, a tubular pivot integral with said bridge portion for swivelly connecting said band and mounting, said open end of said looped mounting adapted to receive a fastener element for engagement over said base portion.

4. A mounting for cable clamps and the like comprising a looped member providing spaced supporting and base portions, means for swivelly connecting said supporting portion to a part supported thereby, the sides of said mounting member being slotted and adapted to receive a fastener part extended therethrough and in engagement with and overlying the base portion thereof and spaced from the swivel connecting means.

5. A mounting for cable clamps and the like comprising an open-ended looped member providing spaced supporting and base portions, means for swivelly connecting said supporting portion to a part supported, the open end of said mounting base portion being adapted to receive a fastener part extended therethrough in engagement with and overlying the base portion thereof.

6. A mounting for cable clamps and the like comprising an open-ended looped member providing spaced supporting and base portions, an integral tubular pivot for swivelly connecting said supporting portion to a part supported, the open end of said mounting member being adapted to receive a fastener part extended therethrough in engagement with and overlying the base portion thereof and spaced from the supporting portion.

WILMER H. CHURCHILL.

REFERENCES CITED

The following references are of record in the file of this patent:

UNITED STATES PATENTS

| Number | Name | Date |
|--------|------|------|
| 624,484 | Haskell | May 9, 1899 |
| 1,087,036 | Mitchell | Feb. 10, 1914 |
| 1,126,845 | Overn et al. | Feb. 2, 1915 |
| 1,373,716 | Dottl et al. | Apr. 5, 1921 |
| 2,236,070 | Rohrdanz | Mar. 25, 1941 |
| 2,265,330 | Waddle et al. | Dec. 9, 1941 |
| 2,327,326 | Churchill | Aug. 17, 1943 |
| 2,338,659 | Moorehouse | Jan. 4, 1944 |
| 2,339,093 | Metheny | Jan. 11, 1944 |